(12) United States Patent
Matsunaga

(10) Patent No.: US 7,474,945 B2
(45) Date of Patent: Jan. 6, 2009

(54) ROUTE GENERATING SYSTEM FOR AN AUTONOMOUS MOBILE ROBOT

(75) Inventor: Shinichi Matsunaga, Wako (JP)

(73) Assignee: Honda Motor Company, Ltd., Tokyo (JP)

( * ) Notice: Subject to any disclaimer, the term of this patent is extended or adjusted under 35 U.S.C. 154(b) by 424 days.

(21) Appl. No.: 11/299,834

(22) Filed: Dec. 13, 2005

(65) Prior Publication Data

US 2006/0155436 A1 Jul. 13, 2006

(30) Foreign Application Priority Data

Dec. 14, 2004 (JP) .............................. 2004-360814

(51) Int. Cl.
*G05D 1/02* (2006.01)
(52) U.S. Cl. .............................. 701/25; 701/301; 901/1
(58) Field of Classification Search ........................ None
See application file for complete search history.

(56) References Cited

U.S. PATENT DOCUMENTS

| | | | | |
|---|---|---|---|---|
| 4,821,192 A | * | 4/1989 | Taivalkoski et al. | 701/25 |
| 4,862,373 A | * | 8/1989 | Meng | 701/209 |
| 5,216,605 A | * | 6/1993 | Yardley et al. | 701/23 |
| 5,280,431 A | * | 1/1994 | Summerville et al. | 701/24 |
| 6,092,010 A | * | 7/2000 | Alofs et al. | 701/23 |
| 2004/0193349 A1 | * | 9/2004 | Flann et al. | 701/50 |
| 2006/0095160 A1 | * | 5/2006 | Orita et al. | 700/248 |

FOREIGN PATENT DOCUMENTS

| JP | 63-200207 | | 8/1988 |
|---|---|---|---|
| JP | 7-281748 | * | 10/1995 |
| JP | 2003-266345 | | 9/2003 |
| JP | 2005-50105 | * | 2/2005 |

* cited by examiner

*Primary Examiner*—Michael J. Zanelli
(74) *Attorney, Agent, or Firm*—Squire, Sanders & Dempsey L.L.P.

(57) ABSTRACT

In a route generating system for an autonomous mobile robot, a plurality of nodes are designated within an area of movement of the robot and an edge is defined between a pair of nodes only if a distance from the one node to the other node is less than a threshold value and there is no obstacle on a line drawn between the one point and the other point. Because the route is generated from a collection of pre-defined edges which are free from obstacles and are selected so as to optimize the generated route, the robot is enabled to travel from the current position to the destination in a safe and optimum fashion. Furthermore, the edges are defined by connecting only those nodes that are relatively close to each other, the candidates of the edges for generating a route can be reduced to a small number and this reduces computational loads. Also, because the route can be selected in a relatively intelligent manner so as to optimize a certain criterion, a clumsy appearance in the movement of the robot can be avoided.

6 Claims, 5 Drawing Sheets

ROUTE GENERATING SYSTEM FOR AN AUTONOMOUS MOBILE ROBOT

TECHNICAL FIELD

The present invention relates to a route generating system for an autonomous mobile robot, and in particular to a route generating system that can simplify programming and reduce computational loads.

BACKGROUND OF THE INVENTION

An autonomous mobile robot is required to be capable of moving about in an area where various obstacles are placed from a current position to a destination in a smooth manner while avoiding the obstacles. To provide such a capability to a robot, it has been proposed to prepare an obstacle database containing information on the positions of obstacles in a map of a designated area according to visual information obtained by the robot, and program the route for the robot by looking up the database. See Japanese patent laid open publication No. 2003-266345.

However, a designated area may not have any pre-defined passages as is the case with showrooms and performance stages, and it is not easy to designate a route for the robot when only the destination is given. The shortest route from the current position to a destination would be given by a straight path connecting these two points. However, when an obstacle is located on such a path, it has been customary for a robot to slightly change the straight path by coming close to the obstacle and passing around the obstacle in the immediate vicinity. This obviously is not the shortest path for the robot to move from the current position to the destination. Furthermore, the robot would make a clumsy appearance.

It may be conceivable to program the robot so as to make use of the visual information obtained by the robot and make a more intelligent decision. However, it would require a highly complex algorithm and increase the computing load. This would cause a delay in the reaction of the robot and increase the power consumption of the computer. As a mobile robot typically relies on a battery for its power, a large power consumption is highly undesirable.

BRIEF SUMMARY OF THE INVENTION

In view of such problems of the prior art, a primary object of the present invention is to provide a route generating system for an autonomous mobile robot which requires a relatively low computing load.

A second object of the present invention is to provide a route generating system for an autonomous mobile robot which is easy to program.

A third object of the present invention is to provide a route generating system for an autonomous mobile robot which allows the robot to avoid an obstacle in a natural way.

According to the present invention, at least some of these objects can be accomplished by providing a route generating system for an autonomous mobile robot, comprising: map managing means for storing and managing a map that describes information on positions of a plurality of nodes and at least one obstacle defined within an area for movement of the robot, the nodes providing possible points for defining a route and the obstacle providing a point through which the robot should not pass; edge defining means for defining a collection of edges each formed by connecting a pair of nodes according to a prescribed edge defining rule; current position detecting means for detecting a current position of the robot on the map; input means for designating a destination of the robot on the map; and computing means for computing a route of the robot from the current position to the destination according to a prescribed optimization rule by connecting the edges; wherein each edge is defined from one node to another only if a distance from the one node to the other node is less than a threshold value and there is no obstacle on a line drawn between the one point and the other point. The criteria for optimizing the generated route can be selected from a time, distance or energy consumption that would be involved for the robot to travel along the route from the current position to the destination.

Because the route is generated from a collection of pre-defined edges which are free from obstacles and are selected so as to optimize the generated route, the robot is enabled to travel from the current position to the destination in a safe and optimum fashion. Furthermore, the edges are defined by connecting only those nodes that are relatively close to each other, the candidates of the edges for generating a route can be reduced to a small number and this reduces computational loads. Also, because the route can be selected in a relatively intelligent manner so as to optimize a certain criterion, a clumsy appearance in the movement of the robot can be avoided.

If the edge defining means is adapted to define additional edges by defining the current position and destination on the map as additional nodes, and the computing means is adapted to compute the route using the additional edges in addition to the regular edges, the current position or the destination is not required to be located in any of the pre-defined nodes, and the flexibility of the system can be enhanced.

If the nodes include at least one reference mark that can be detected by the robot, the robot is enabled to identify the current position without accumulating errors by adjusting the estimated position of the robot by detecting the reference mark. The input means may be adapted to designate an intermediate point that the robot should pass through as an additional node to increase the freedom of movement of the robot, and such an intermediate point may consist of a reference mark so that the robot may adjust the estimated current position by comparing it with the reference mark as it travels from the current position to the destination.

To simplify the process of registering the destination and other data, the input means may be provided with a display device showing the area for movement of the robot. As is often the case with an autonomous robot, the current position detecting means may be provided on the robot which is further provided with means for transmitting the detected current position to the input means.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
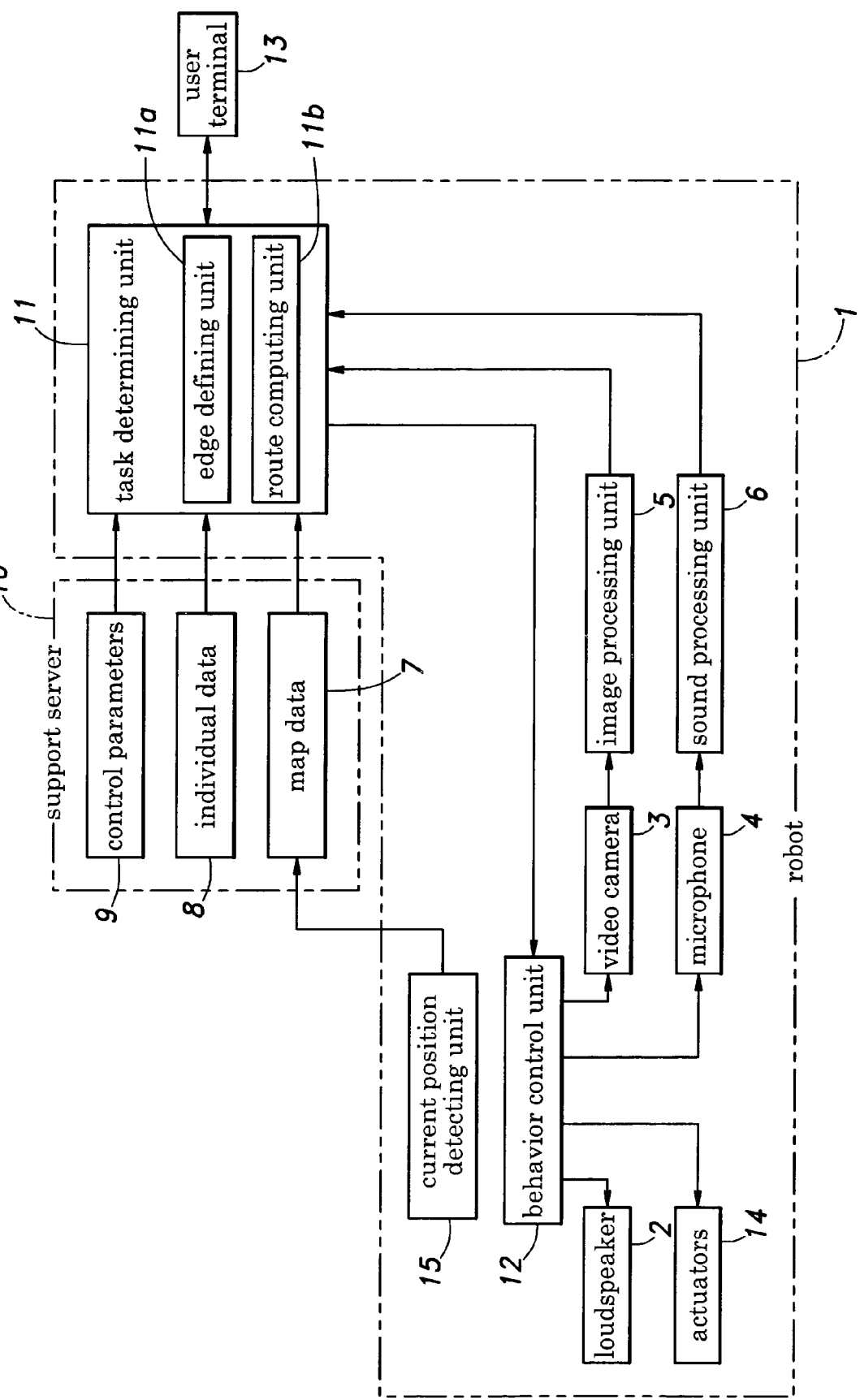
FIG. 1 is a block diagram showing the functional structure of the robot embodying the robot.

FIG. 1 is a block diagram showing the overall structure of an autonomous mobile robot embodying the present invention. The robot 1 is provided with a loudspeaker 2, a video camera unit 3 and a microphone unit 4. The image signal obtained from the video camera unit 3 is forwarded to an image processing unit 5, and the audio signal obtained from the microphone unit 4 is forwarded to a sound processing unit 6. A speech signal generated by a speech synthesis unit is forwarded to the loudspeaker 2.

The video camera unit 3 comprises a pair of monochromatic or color imaging devices, and can be (laterally) panned and (vertically) tilted by means of an electric motor. The image signal from the video camera unit 3 is digitized by a frame grabber, and movement of an object is detected by comparing a pair of adjacent or separated frames. The two imaging devices provide stereographic information on the distance to the object. The image processing unit 5 performs various image processes such as the detection of profiles, the determination of the positions of moving objects and the identification of human faces.

The sound processing unit 6 is adapted to eliminate background noises and echoes so as to facilitate the extraction of the target sound, and estimate if the sound is human speech or impulsive sounds produced by the collision of objects from the rise quality of the sound. Also, as the microphone unit 4 includes a pair of microphones, the sound processing unit 6 can determine the location of the source of the sound from the differences in the sound pressure and the arrival time between the two microphones.

The robot 1 also receives various pieces of information from a robot support server 10 comprising a map data managing unit 7 for storing map data on the layout of various fixtures and areas from which the robot should stay away, such as a transformer and a heater, that may be present or defined within the range of movement of the robot, an individual data managing unit 8 for storing general information, such as the ID number, name, sex, date of birth and blood type of registered persons, occupation information, such as the name of the company, department, post, telephone number, main address and terminal information of registered persons, and individual information consisting of face data to enable face recognition, and a control parameter data managing unit 9 storing control parameters based on environmental data such as the kind of illumination provided in each of a plurality of regions within the mapped area, brightness, average noise level, echo properties and floor hardness.

The robot 1 comprises a task determining unit 11 for determining the behavior pattern of the robot 1 according to the information derived from the obtained images, sounds, maps, environment and various pieces of information on each individual, and issuing behavior commands to a behavior control unit 12. The task determining unit 11 receives image process signals directly from the image processing unit 5 and sound process signals directly from the sound processing unit 6, and issues a behavior correction commands for adjusting the behavior of the robot 1 to the changing environment.

The task determining unit 11 is adapted to remotely communicate with a user terminal 13 including an input device such as a keyboard and a touch panel and a monitor such as a LCD panel, and the user terminal 13 can be used not only as a user interface for remotely controlling the startup, stopping and returning of the robot 1 to a designated home position according to the commands of the operator but also for monitoring the state variables of the robot 1 such as the images obtained by the video camera unit 3, the sounds obtained by the microphone unit 4 and the values of various control parameters. The operator is allowed to newly enter and update various pieces of information and control parameters.

The task determining unit 11 comprises an edge defining unit 11a for defining edges or line segments along which the robot is to walk and a route computing unit 11b for computing an optimum route meeting a set of certain criteria from a current position to a destination by connecting the available edges.

The behavior control unit 12 feeds action command values which are determined according to prescribed action commands supplied by the task determining unit 11 to actuators 14 provided in the joints of the arms and legs so as to control the movement of the robot 1. In particular, the part of the behavior control unit 12 responsible for the movement of the legs receives commands on the pace and the number of steps, and controls the leg joints accordingly. The behavior control unit 12 feeds action commands also to the video camera unit 3 and microphone unit 4.

A current position detecting unit 15 detects the angular change in the direction of the movement and the travel distance of the robot 1, and estimates the current position of the robot 1 from such data in addition to the data obtained from a gyro sensor or other GPS devices. The current position data is fed back to the task determining unit 11 via the map data managing unit 7 so that the robot 1 is enabled to adjust the bearing and position by comparing the target position with the current position.

Figure 2:
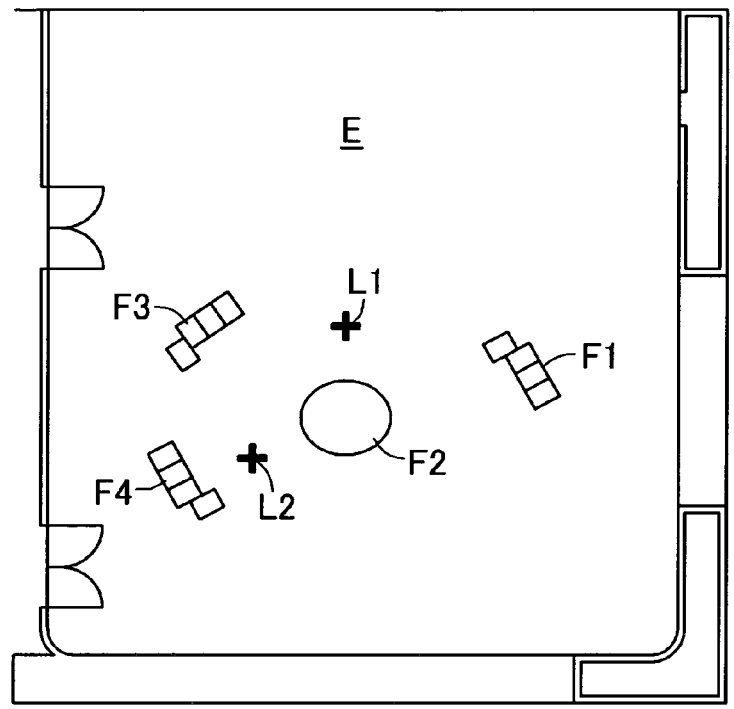
FIG. 2 is a layout view showing a region for movement of the robot.

FIG. 2 is a plan view showing an example of an area E of movement of the robot 1. The plan view is based on the map data stored in the map data managing unit 7, and includes fixtures F1 to F4 considered as obstacles for the robot 1 and floor marks L1 and L2 which the robot 1 is able to visually identify. This plan view is shown on the screen of the monitor of the user terminal 13 so that the operator may use it as a graphic user interface on which the operator may enter commands by using a mouse pointer or the like. The display on the monitor may also include areas which the robot 1 should stay away such as a heater, transformer or the like in addition to ordinary obstacles which the robot 1 should avoid.

Figure 3:
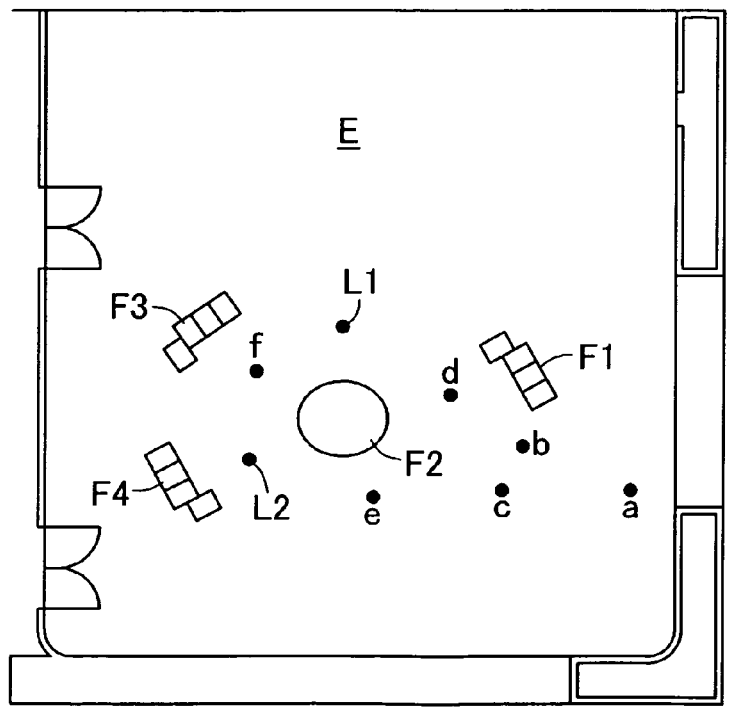
FIG. 3 is a layout view similar to FIG. 2 showing the regular nodes.

The operator can select and register a desired number of nodes a to f in the region where the robot 1 is expected to move about, for instance, as shown in FIG. 3. These nodes may include the floor marks L1 and L2. The nodes should be registered so as to cover the entire region at a required density. More specifically, the nodes are selected in such a manner that each node is located within a prescribed distance (threshold value) of at least one node as will be described hereinafter. The route for the robot 1 is generated by connecting edges that are in turn defined by connecting these nodes. These edges are each defined as a line segment that connect any selected pair of nodes that meet two conditions. The first condition is that the two nodes are located within a threshold distance from each other. The second condition is that there is no obstacle between the two nodes. If any particular pair of nodes do not meet these conditions, an edge would not be defined between these nodes.

Figure 4:
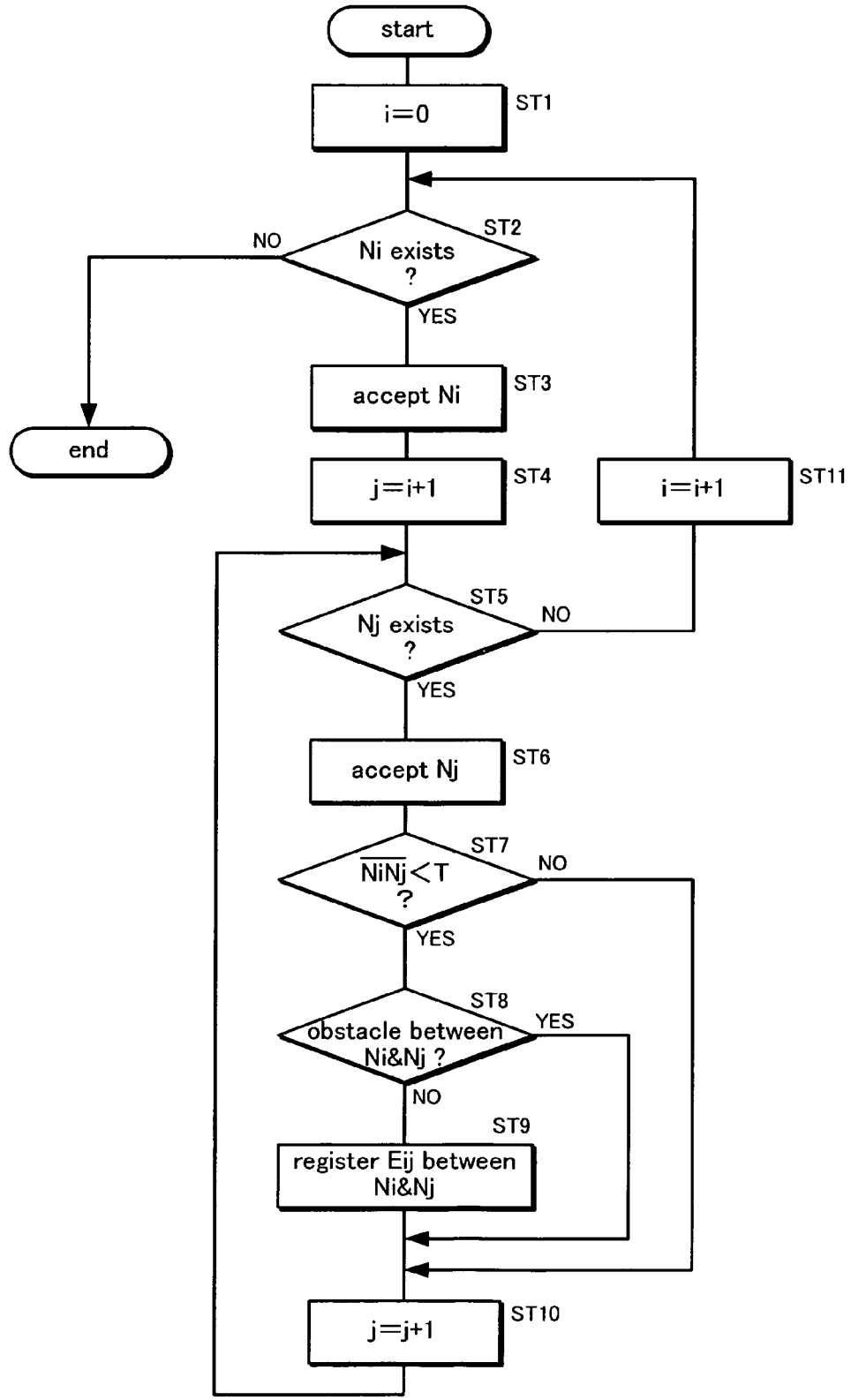
FIG. 4 is a flowchart showing the control for registering the regular edges.

The control flow for registering such nodes is described in the following with reference to the flowchart of FIG. 4.

First of all, a counter i is set to zero (ST1), and looks for node N0. However, for the convenience for the description, suppose that Ni is to be looked for. If Ni exists (ST2: yes), the node Ni is accepted (ST3). If no further node Ni is found, as it means that all the nodes have been processed, the program flow ends. When Ni is accepted, Nj selected from those which have not been processed yet is looked for from j=i+1 onward (ST4). If Nj exists (ST5), it is accepted (ST6).

Then, an edge starting from Ni is defined. An edge can be drawn only to node Nj only if the distance between them is within a prescribed threshold distance (such as 5 m) (ST7: yes) and there is no obstacle between them (ST8: yes). When such node Nj is found, an edge Eij is defined between them (ST9) and registered before the program flow advances to step ST10. If Nj is found to be too far away (ST7: no) or there is an obstacle on the way (ST8: no), the program flow advances to step ST10 without defining or registering an edge.

Figure 5:
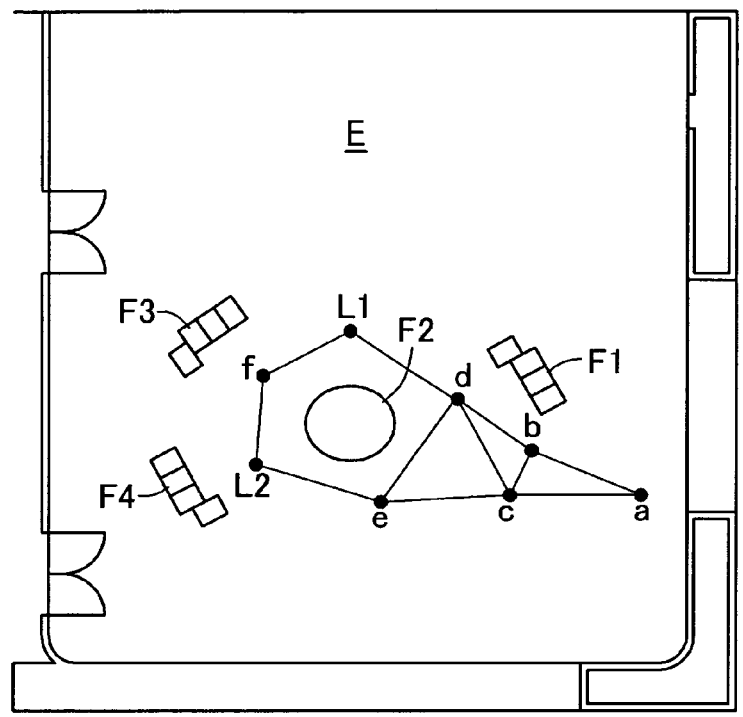
FIG. 5 is a layout view similar to FIG. 2 showing the regular edges.

In step ST10, a counter j is incremented (j=j+1), and the program flow returns to step ST5. In this manner, the steps from ST5 to ST10 are repeated until all the nodes Nj in relation with Ni are exhausted and all the possible edges starting from Ni are defined. For instance, in FIG. 5, an edge is defined between nodes b and c and between nodes b and d, but no edge is defined between nodes b and e which are too far away from each other or between nodes e and f which have an obstacle F2 between them. Once all the nodes Nj in relation with Ni are exhausted, the counter i is incremented (i=i+1) in step ST11, and the steps ST2 to 10 are repeated with respect to a new node Ni. When all the nodes are exhausted, all the possible edges which may be used for generating the route for the robot will be defined.

Figure 6:
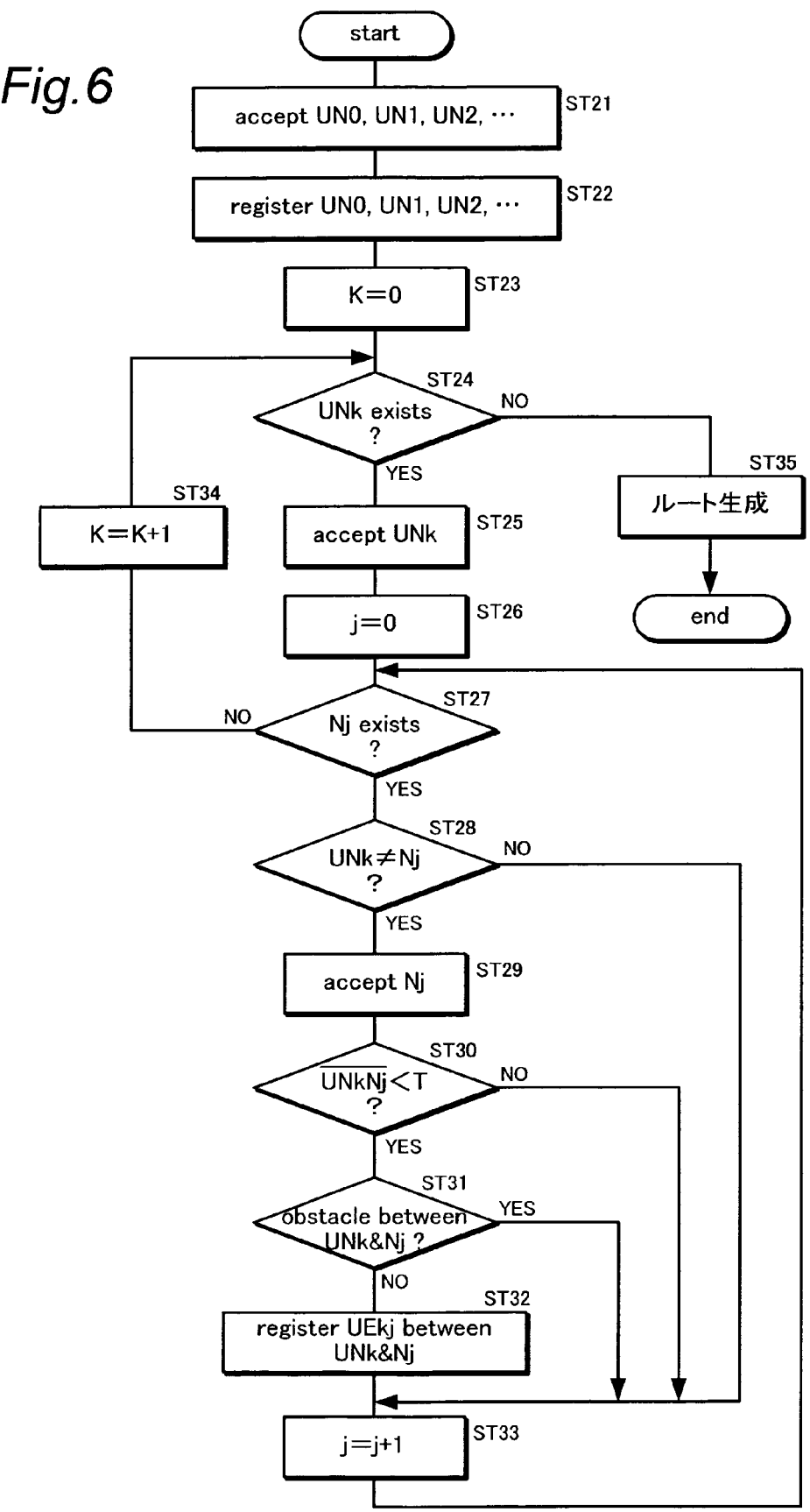
FIG. 6 is a flowchart showing the control for registering the additional edges.

When generating a route for the robot 1, the current position of the robot 1 and a destination must be indicated on the map. These positions in general do not coincide with the nodes. If desired, an intermediate point may also be indicated on the map as a point the robot must pass through on its way from the current position to the destination. The control flow for indicating such points and interfacing these points with the edges that are already defined in advance as described above is now described in the following with reference to FIG. 6.

The operator enters the current position UN0 of the robot (HP in FIG. 7, for instance) and a destination UN1 (point A in FIG. 7, for instance) from the user terminal 13 (ST21). The operator may optionally indicate an intermediate point UN2 if desired. These points are registered (ST22). A count k is set to zero (ST23), and looks for a node UN0. To generalize the explanation, suppose that node UNk is to be looked for. When node UNk exists (ST24: yes), it is accepted (ST25). Then, the existing nodes Nj are looked for one after another (ST26). If node Nj exists, it is determined if it coincides with node UNk (ST28). If not, node Nj is accepted (ST29).

If the robot moves between a special node, such as the current position, destination and intermediate point, which does not coincide with any of the registered nodes and any particular registered node, it is advantageous to select such nodes that are relatively close to the special node. Therefore, an edge is defined between the special node UNk and node Nj if two conditions are met. The first condition is that the node is located within a threshold distance such as 5 m from the special node (ST30). This threshold distance may be same as that of the control flow illustrated in FIG. 4, or may be different from it. The second condition is that there is no obstacle between the two points (ST31). Only if these two conditions are met, an edge is defined between these two points (ST32) and the program flow advances to step ST33. If any particular node does not meet these conditions, an edge would not be defined between the special node and the particular node, and the program flow advances to step ST33 without defining an edge. In step ST33, j is incremented (j=j+1), and the program flow returns to step ST27 to look for a new node Nj.

Figure 7:
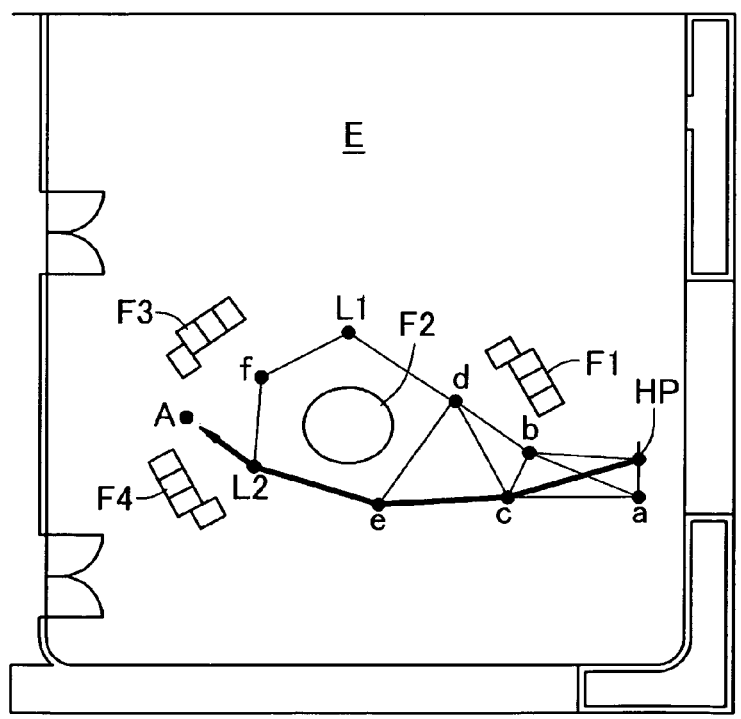
FIG. 7 is a layout view similar to FIG. 2 showing the generated route based on the additional edges and regular edges.

If all the nodes Nj have been exhausted in step ST27, the counter k is incremented (k=k+1) in step ST34, and the program flow returns to step ST24 to look for new special nodes. If all the special nodes Nk have been exhausted in step ST24, as all the possible edges Eij and UEkj have been registered, the system can now compute an optimum route, which for instance may consist of a shortest path, by connecting these edges Eij and UEkj by using any of known algorithms (ST35). As such algorithms are per se known and do not form a part of the present invention, detailed description of such algorithms is omitted from the description. FIG. 7 shows the map when the additional edges UEkj are drawn from the special nodes such as the current position and destination to the regular nodes Nj that have already been registered in advance, in addition to the regular edges that are drawn between regular nodes Nj. The generated route is indicated by bold lines that extend from the current position HP and destination A.

When the operator enters a command, for instance, to move from the home position HP to point A on the plan view displayed on the monitor of the user terminal 13, a route HP-c-e-L2-A that is automatically formed by connecting these points so as to give a shortest route is generated. The robot 1 then follows this generated route. In the illustrated embodiment, when determining the route, only the distances on the map are taken into account, but various other factors, such as the condition of the floor surface, the inclination of the floor surface and the level of congestion, are not taken into account. Therefore, when the route is determined based solely on the distance, it may not be optimum depending on the need. For this reason, it is more desirable to compute evaluation values that take into account the required time and energy consumption and select a route that would maximize the evaluation values. Such evaluation values may be defined by the operator in advance, or, alternatively, may be based on the data which is compiled from the past experiences.

The autonomous mobile robot 1 of the illustrated embodiment is provided with the current position detecting unit 15 that enables the robot 1 to identify the distance and direction of its movement according to an output from a gyro sensor and/or sensors provided in association with the various actuators as it moves about, but the detected position is only an estimated value, and may not given an exact global position of the robot 1. Therefore, the robot 1 may adjust the detected position by using the floor marks L1 and L2 from time to time. For instance, when the robot 1 is about to travel a relatively long distance from the current position to a destination, the route may be generated so as to pass at least one of such floor marks so that the robot 1 may be able to adjust its estimated position as it passes the floor mark, and that an error in the estimated current position of the robot 1 may not accumulate in time. The floor marks L1 and L2 may consist of not only those that can be visually identified but may also those using electromagnetic signals for position identification.

The fixtures in the area for the movement of the robot may be removed and/or added from time to time. It is therefore desirable to allow the operator to delete and/or add obstacles in the map data. For instance, when the edge between nodes c and e is removed or canceled, for instance, because a new fixture is placed on this particular edge, the newly generated route would consist of a route HP-b-d-L1-f-A.

Thus, the present invention allows an optimum route from a current position to a destination to be easily and quickly generated without requiring any complex computation for avoiding obstacles or increasing the computational load by covering all possible edges. The advantages of the present invention can be particularly enhanced by suitable selecting the number and arrangement of the nodes.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A route generating system for an autonomous mobile robot, comprising:
   map managing means for storing and managing a map that describes information on positions of a plurality of nodes and at least one obstacle defined within an area for movement of the robot, the nodes providing possible points for defining a route and the obstacle providing a point through which the robot should not pass;
   edge defining means for defining a collection of edges each formed by connecting a pair of nodes according to a prescribed edge defining rule;
   current position detecting means for detecting a current position of the robot on the map;
   input means for designating a destination of the robot on the map; and
   computing means for computing a route of the robot from the current position to the destination according to a prescribed optimization rule by connecting the edges;
   wherein each edge is defined from one node to another only if a distance from the one node to the other node is less than a threshold value and there is no obstacle on a line drawn between the one point and the other point.

2. The route generating system according to claim 1, wherein the edge defining means is adapted to define additional edges by defining the current position and destination on the map as additional nodes, and the computing means is adapted to compute the route using the additional edges in addition to the regular edges.

3. The route generating system according to claim 2, wherein the optimization rule optimizes a time, distance or energy consumption that would be involved for the robot to travel along the route from the current position to the destination.

4. The route generating system according to claim 3, wherein the nodes include at least one reference mark that can be detected by the robot.

5. The route generating system according to claim 1, wherein the input means is adapted to designate an intermediate point that the robot should pass through as an additional node.

6. The route generating system according to claim 1, wherein the input means is provided with a display device showing the area for movement of the robot.

* * * * *